Aug. 11, 1970    W. A. PATERSON    3,523,409
PORTABLE AIR FILTER
Filed Aug. 26, 1968
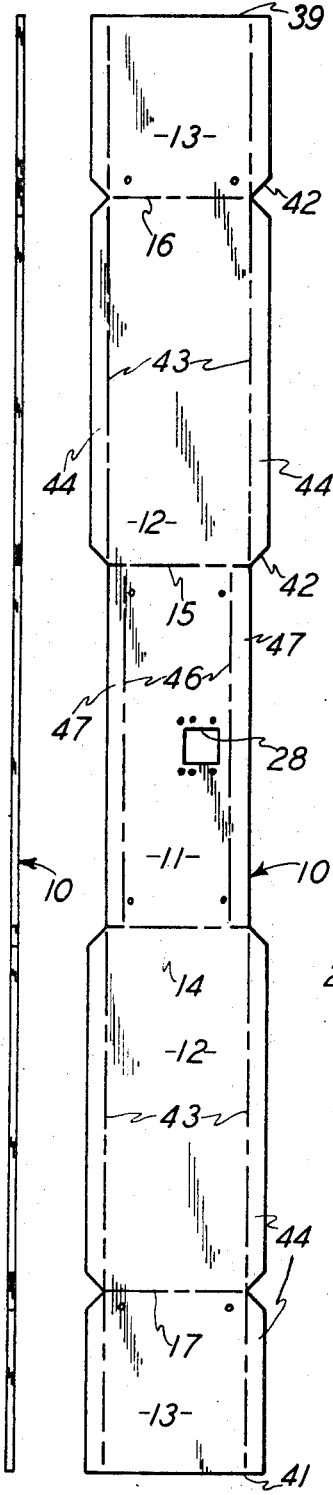
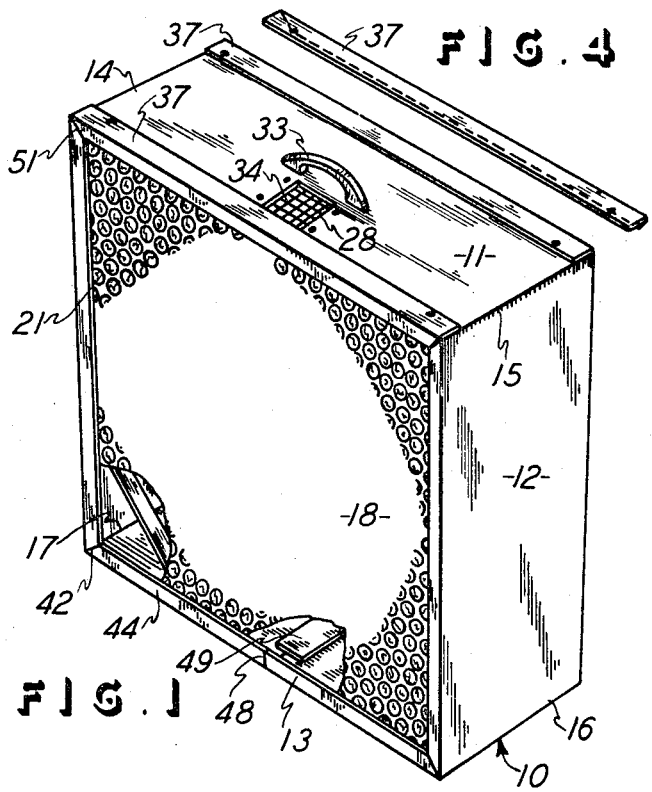
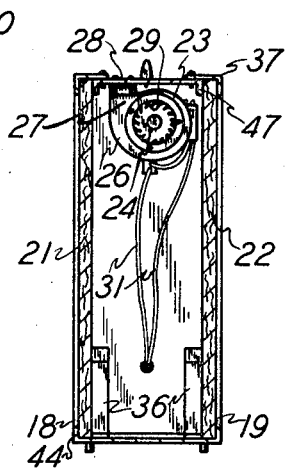
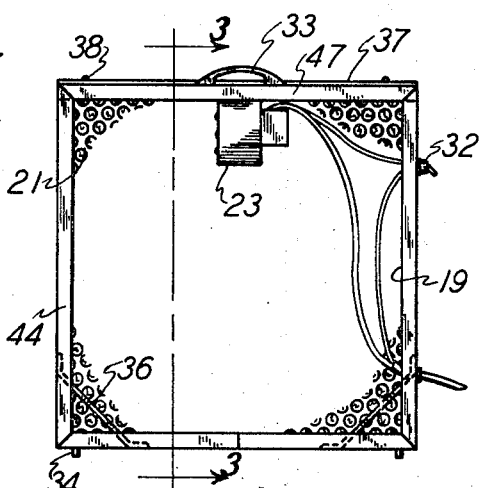
INVENTOR:
WERNER A. PATERSON
BY *Arthur J. Hansmann*
ATTORNEY

3,523,409
PORTABLE AIR FILTER
Werner A. Paterson, 3222 N. Main St.,
Racine, Wis. 53402
Filed Aug. 26, 1968, Ser. No. 755,078
Int. Cl. B01d 46/10
U.S. Cl. 55—471                                    2 Claims

ABSTRACT OF THE DISCLOSURE

A portable air filter with a support structure and an air-pervious filter member and an air blower. A support structure is shown to be box shaped, and it is also shown to contain the air outlet in communication with the blower. The effective area of the filter member is many times larger than the area of the air outlet so that the velocity of the air moving over the filter member will be low, and the entire unit is therefore efficient in filtering the air.

BACKGROUND OF THE INVENTION

This invention relates to a portable air filter. The prior art includes air filters which have framing for supporting filter members and blowers and with the framing having outlet openings for the discharge of the filtered air. These structures are provided in permanent installations, and are commonly used in connection with duct-work for furnaces for buildings. Further, these prior units have air openings which are of a size comparable to the air outlet openings, and this provides for a similar velocity of air entering the structure compared to the air velocity leaving the structure. Thus, where the filter blower is of a capacity such that the air outlet opening is suitably designed for handling the entire capacity of the blower, then the air moves across the filters at a relatively high velocity when the air inlet opening and the filter member effective surface are both similar to the size of the air outlet opening. Such high velocity of air through the filter significantly reduces the efficiency of the filter.

It is the object of the present invention to provide an improved air filter, and to make it portable for movement from room-to-room within a building, or from location-to-location as desired. In accomplishing this object, the entire filter is arranged so that a maximum of effective filter surface is utilized compared to the overall size of the entire filter structure. Thus the entire filter structure is convenient to handle, light weight, suitably arranged to be safe even though it is positioned in an opened position in a room, and the filter structure is attractive in appearance.

Another object of this invention is to provide an air filter which is simple but yet sturdy in its construction, inexpensive to manufacture, efficient in filtering the air, quiet in its operation and is therefore suitable for use in a room as a portable unit, and the filter members can be easily replaced. The filter unit of this invention is therefore especially suitable for filtering dust from the air in a room such as any ordinary room in a house, and also including a laboratory where due to working conditions there may be dust created in the laboratory and it is necessary to eliminate the dust from the air.

BRIEF DESCRIPTION OF THE DRAWING

FIG. 1 is a perspective view of an air filter of this invention with portions of the filter member broken away.

FIG. 2 is an elevational view of FIG. 1 with parts broken away.

FIG. 3 is a sectional view taken along the line 3—3 of FIG. 2.

FIG. 4 is a view of a part of FIG. 1.

FIGS. 5 and 6 are views of a part of FIG. 1 before that part is shaped as shown in the final form in FIG. 1.

DETAILED DESCRIPTION OF THE PREFERRED EMBODIMENT

A frame or support member generally designated 10 includes a top 11, two sides 12, and a bottom 13. Thus the support structure 10 is four sided or rectilinear and box shaped to present the four corners 14, 15, 16, and 17. The top 11, bottom 13, and two sides 12 thus define a front open face 18 and a rear open face 19, with these two faces being the same size and extending for a length and width throughout the dimensions between the top and bottom and the two sides. Thus a filter member 21 is disposed across the front face opening 18, and a filter member 22 is disposed across the rear face opening 19, as seen in FIG. 3. The filter members 21 and 22 may be of a conventional design and they include the usual rigid material for supporting filtering material, and of course the filters are air pervious for removing dust from the air flowing through the filters. Also, the filters may be chemically treated to remove bacteria and germs from the air flowing therethrough.

FIGS. 2 and 3 further show a blower 23 supported on the support structure 10 and secured to the under-side of the top 11 by suitable screws or the like. The blower has a rotatable blower wheel 24, and it also has a blower case 26 which has its discharge opening 27 in flow communication with an air outlet opening 28 in the top 11. The cross-sectional size of the blower discharge duct 27 is substantially the same as the area or size of the air outlet 28. Thus, the discharge duct 27 is suitable for handling full capacity of the blower wheel or impeller 24, and therefore the air outlet opening 28 is also of a size suitable to handle the full capacity of air discharge from the blower 23. Of course air will enter the blower 23 in an axial direction and through the opening designated 29 in FIG. 3. The blower 23 is thus positioned on the hollow interior of the support structure 10, and this places the blower 23 between the filter members 21 and 22, as shown.

Electric wires 31 extend from the blower and through the one side 12 of the structure 10. Also, an electric switch 32 is mounted on that structure side 12, so normal and conventional operation of the blower 23 is possible.

At this point it will therefore be understood that the structure 10 is movable to the extent of the length of the elecric wires 31, and it has a handle 33 affixed to the top 11 to make it convenient for the operator to move the unit. Also, feet 34 are suitably affixed to the bottom 13 for supporting the unit on the floor or the like. Further, FIG. 1 shows the outlet opening 28 adjacent the handle 33 has a protective screen 34 extending across the opening 28, and the unit is therefore safe and one cannot place fingers or a hand into the blower 23 through the blower is mounted on the top 11, as described.

Four members 36 are suitably affixed to the sides 12 and the bottom 13 to extend across the corners 16 and 17, as shown. Thus the members 36 serve the dual purpose of structurally bracing the support structure 10 and holding and guiding the filters 21 and 22. That is, the filters 21 and 22 are shown in FIG. 3 to be in abutment with the members 36, and the filter members 21 and 22 are also slidable into and out of the structure 10.

Two angle members 37 are removably disposed along opposite edges of the top 11 and directly over the respective filter members 21 and 22. FIG. 4 shows one of the members 37 removed from the support structure 10, and it will be understood that these members are right angle members and they are shown to be secured to the top 11 by means of screws 38 extending therethrough and into suitably provided holes in the top 11. Thus removal of the members 37 will permit removal or replacement of the filter members 21 and 22. The members 37 also provide a reinforcement or structural purpose with respect to the support member 10, as will be explained later.

FIGS. 5 and 6 show the support structure 10 prior to its being formed into the box shape shown in the other figures. Thus a length of a single piece of material, such as metal, continuously extends from one edge 39 to the other edge 41. The piece may be cut or stamped to the shape shown in FIG. 5, and the side edges have the angled surfaces or notches 42, as shown. FIG. 5 further shows that the piece is bent along the dot-dash lines shown, to form the four corners 14, 15, 16, and 17. Also, dot-dash lines 43, along the opposite edge of the structure piece 10, indicate the lines along which the piece is bent to form the corners to provide inturned edges 44 on the support structure 10. Initially, dot-dash lines 46 indicate bend lines on the piece 10 for forming additional in-turned edges 47.

FIG. 5 also shows then that the top 11 is of a width less than the width of the two sides 12 and the bottom 13. Further, then the filter members 21 and 22 are contained within the limits of the width of the sides 12 and bottom 13, but the filter members 21 and 22 are actually outside the limits of the width of the top 11, as shown in FIG. 3. Thus, the in-turned edges 44 serve as supports and guides for the filter members to the outsides of the filter members 21 and 22. Likewise, the in-turned edges 47, along with the members 36, serve as guides and supports for the filter members 21 and 22 toward the insides of the structure 10 for the filter members 21 and 22.

The ends 39 and 41 of the structure piece are shown in abutment at the joint designated 48, and a piece 49 is secured across the joint, as by any suitable means, for securing the ends 39 and 41 rigidly together.

Thus, it is significant that the size of the outlet opening 28 is sufficient to handle the full air-blowing capacity of the blower 23, but the size of the outlet opening 28 is less than one-twentieth of the area of the effective filter surfaces as defined by the openings 18 and 19. In fact, the surface area of the filter member 21 or 22 has been found to be suitable at four hundred square inches while the area of the opening 28 is suitable at four square inches. Thus the ratio would be one hundred to one between these areas of one of the filters 21 and the outlet 28. For the two filters 21 and 22, the ratio would then be two hundred to one. With this high ratio, the filter members 21 and 22 can be efficient in removing the dust from the air, since the air flowing through the filter members will be at a low velocity although adequate and suitable total capacity of air is moved through the filter unit and of course out the exhaust opening 28. Thus the filter members 21 and 22 may be of a length and width to be twenty inches by twenty inches and of a thickness of one inch, and the opening 28 may be of a length and width of two inches by two inches. This means that the ratio of the area of each of the filter members to the area of opening 28 is at least twenty-to-one.

By arrangement of the top 11 with its in-turned edges 47, and the members 37 being screwed to the top 11 as described, and further with the members 37 having beveled or angled edges 51, the entire structure is sturdy by virtue of this arrangement. That is, the bevel 51 abuts the adjacent bevels or angles 42 on the base piece forming the structure 10, and the screws 38 anchor the pieces 37 for having these pieces render structural support along with the structural support provided by the in-turned edges 47. Thus, if a person were inclined to sit on this filter unit, the unit would be capable of withstanding such abuse, and it will also retain its rectilinear shape so that the filter members 21 and 22 can be readily replaced as desired and needed.

What is claimed is:

1. A portable air filter, comprising an elongated metal piece bent along its width to present a rectangular box-shaped support structure, said support structure having a top wall and a bottom wall and two side walls and having an open front face and an open rear face and a hollow interior between said faces, a rectilinear filter member extending over each of said faces, said top wall being of a width less than that of said side walls and defining recesses along the sides of said top wall with said side walls for receiving said filter members in said recesses, in-turned edges on each of said two side walls for slidably guiding said filter members into and out of said recesses in said support structure in the upright direction across said top wall, an angle member removably attached to said support structure and extending above each of said filter members and across said recesses for securing said filter members on said support structure and structurally supporting said support structure, said top wall having an opening therein and being of an area less than one-twentieth of the total area of each of said filter members, an air blower mounted on said support structure and disposed in said hollow interior and having an exhaust outlet connected in air-flow communication with said top opening, said air blower having an air inlet for drawing air into said hollow interior through both said filter members and at a low air-flow velocity relative to the air-flow velocity at said blower exhaust outlet, in accordance with at least a twenty-to-one area ratio between the area of each of said filter members and the exhaust outlet area.

2. A portable air filter of claim 1 including braces on said support structure at said bottom wall thereof and adjacent said filter members for supporting the latter and strengthening said support structure.

References Cited

UNITED STATES PATENTS

| | | | |
|---|---|---|---|
| 1,596,950 | 8/1926 | Semonin. | |
| 2,232,375 | 2/1941 | Eliason et al. | 55—473 |
| 2,808,124 | 10/1957 | Attwood | 55—385 |
| 2,873,908 | 2/1959 | Powers | 55—467 |
| 3,077,825 | 2/1963 | Jenson. | |
| 3,080,695 | 3/1963 | Hay | 55—471 |
| 3,126,428 | 3/1964 | Ash | 261—97 |
| 3,223,393 | 12/1965 | Goettl | 261—97 |
| 3,348,365 | 10/1967 | Dupre | 261—97 |
| 3,375,640 | 4/1968 | Pelosi. | |
| 3,406,530 | 10/1968 | Riello | 62—262 |
| 3,148,956 | 8/1964 | Hetherwick et al. | 55—473 |

FRANK W. LUTTER, Primary Examiner

B. NOZICK, Assistant Examiner

U.S. Cl. X.R.

55—481, 482, 504